2,332,865

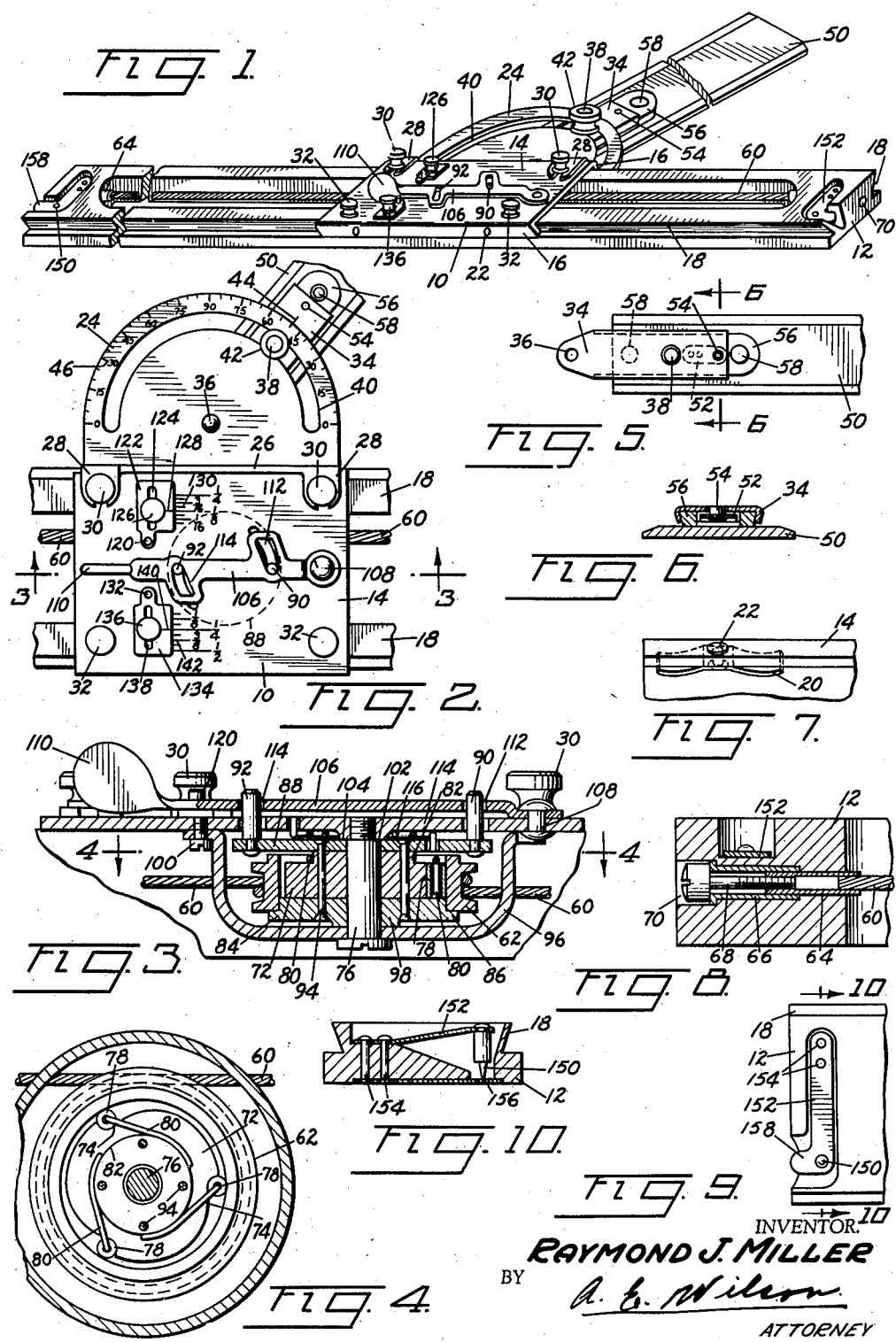
Oct. 26, 1943.   R. J. MILLER   2,332,865
CROSSHATCHING INSTRUMENT
Filed June 10, 1941
INVENTOR.
RAYMOND J. MILLER
BY
ATTORNEY Patented Oct. 26, 1943

UNITED STATES PATENT OFFICE 2,332,865

CROSSHATCHING INSTRUMENT

Raymond J. Miller, Detroit, Mich., assignor to American Pattern and Manufacturing Co., Detroit, Mich., a copartnership Application June 10, 1941, Serial No. 397,456

18 Claims. (Cl. 33—110)

This invention relates to drafting instruments and more particularly to an improved instrument whereby parallel lines such for example as section lines of any desired spacing may be readily drawn.

In the engineering profession it is customary to indicate sectional views of various parts or elements by the use of a plurality of angularly related relatively closely spaced parallel lines. Different materials may be indicated by the use of variously spaced parallel lines or groups of parallel lines. Ferrous materials such for example as iron may be represented by the use of uniformly spaced parallel lines, while non-ferrous materials such as aluminum may be represented by the use of alternately spaced wide and narrow parallel lines.

Considerable difficulty has been experienced in the formation of these parallel lines known in the trade as "crosshatching." This type of work is both time consuming and tedious because of the parallel lines must be uniformly spaced. Considerable skill is required to enable a draftsman to do this type of work with a reasonable degree of rapidity because it has been necessary for the draftsman to visually gauge the distance between the parallel or crosshatching lines. The result is that it frequently takes as long or longer to apply the crosshatching to drawings as it does to lay out the drawing. This type of work is extremely hard on the eyes and results in nervous fatigue.

An object of this invention is to provide an instrument whereby parallel lines of uniform or non-uniform spacing may be readily applied to drawings to indicate sectional views of elements or parts formed of various materials.

A further object of the invention resides in the provision of a crosshatching instrument whereby parallel lines of uniform spacing, or alternately spaced wide and narrow parallel lines may be readily drawn.

Another object is to provide an instrument having a movable carriage supporting an angularly adjustable arm which may be moved longitudinally of the instrument to facilitate the formation of parallel section lines.

Yet a further object of the invention resides in the provision of a crosshatching instrument having a carriage movable longitudinally of the instrument in a step-by-step movement to permit the formation of parallel section lines of any desired uniform width or of alternately spaced uniform widths.

Still another object is to provide a novel actuating mechanism whereby a movable carriage may be advanced longitudinally of an instrument by uniformly or non-uniformly spaced steps of predetermined distance.

Another object of the invention resides in the provision of an improved actuating mechanism for a movable carriage of a crosshatching instrument whereby the movable carriage may be progressively advanced on a flexible member extending longitudinally of the instrument by a controlled step-by-step movement.

A further object is to provide readily accessible means for quickly and easily varying the extent of movement of a movable member of a crosshatching instrument to form uniformly spaced lines of any desired predetermined width.

Yet a still further object of the invention is to provide a crosshatching instrument having a lever movable in opposite directions to move a ruling blade carrier a uniform predetermined distance as the lever is actuated in opposite directions, or to move the carrier predetermined non-uniform distances along the instrument as the lever is moved in opposite directions.

Another object of the invention is to provide a crosshatching instrument which may be readily used by left handed as well as right handed draftsmen.

A further object is to provide an improved crosshatching instrument of simple and rugged construction which may be economically manufactured.

Still a further object of the invention resides in the provision of an improved device whereby parallel lines of any desired predetermined width or of alternately spaced predetermined widths may be readily drawn for any desired purpose.

Another object is to provide a crosshatching instrument having a longitudinally extending frame which may be detachably connected to a drafting board, and a ruling blade carrier movably mounted on the frame in such a manner that it can be readily moved longitudinally in steps of a desired predetermined distance while the frame is attached to the drafting board to facilitate the formation of parallel crosshatching lines.

Yet a further object of the invention is to provide a crosshatching instrument having a ruling blade carrying member which may be quickly and accurately moved to any adjusted position relative to previously drawn crosshatching lines.

Other objects and advantages of this invention will be apparent from the following detailed description considered in connection with the accompanying drawing, submitted for purposes of illustration only, and not intended to define the scope of the invention, reference being had for that purpose to the subjoined claims.

In the drawing wherein similar reference characters refer to similar parts throughout the several views:

Fig. 1 is a perspective view of the improved crosshatching instrument.

Fig. 2 is a plan view of the actuating and adjusting mechanisms of the device.

Fig. 3 is a vertical sectional view taken substantially on the line 3—3 of Fig. 2 looking in the direction of the arrows.

Fig. 4 is a sectional view taken substantially on the line 4—4 of Fig. 3 looking in the direction of the arrows.

Fig. 5 is a plan view of the ruling blade attaching mechanism.

Fig. 6 is a sectional view taken substantially on the line 6—6 of Fig. 5 looking in the direction of the arrows.

Fig. 7 is a fragmentary plan view of tension adjusting mechanism for the movable carriage.

Fig. 8 is a fragmentary longitudinal sectional view of the tension adjusting mechanism for the flexible member along which the ruling blade carrier moves.

Fig. 9 is a plan view of the securing means for detachably connecting the instrument to a drafting board.

Fig. 10 is a sectional view taken substantially on the line 10—10 of Fig. 9 looking in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and is not intended to limit the invention claimed herein beyond the requirements of the prior art.

Referring now more particularly to Fig. 1, it will be observed that the invention is illustrated as being embodied in an instrument having a ruling blade carrier 10 mounted for longitudinal movement on a bar 12.

The carrier 10 is provided with a substantially flat plate 14 having angularly inclined side walls 16 adapted to lie within and engage a pair of spaced guide tracks 18 extending longitudinally of the bar 12. Yielding means such for example as springs 20 carried by studs 22 positioned in one of the side walls 16 may be provided to yieldingly urge the other side wall 16 of the carrier 10 into engagement with its associated track 18 to maintain the carrier 10 in a predetermined angular relation relative to the bar 12.

A ruling blade carrying protractor 24 is provided with an edge portion 26 shaped to engage the side walls 16 of the carrier 10. The protractor 24 is provided with a pair of bifurcated attaching segments 28 adapted to be engaged by thumb screws 30 or 32 to detachably lock the protractor 24 to the plate 14 of the carrier 10.

A ruling blade holder 34 is pivotally connected to the protractor 24 at 36 and is provided with a stud 38 adapted to project through an arcuate shaped slot 40 formed in the protractor 24. A thumb screw 42 may be threaded on the stud 38 to engage the walls of the protractor on opposite sides of the slot 40 to securely lock the ruling blade holder 34 in any adjusted angular position relative to the protractor 24. The angular position of the holder 34 with respect to the protractor 24 can be determined by observing the position of a reference line 44 carried by the holder 34 in relation to a scale 46 carried by the protractor.

A ruling blade 50 may be detachably connected to the holder 34 by means of a spring clip 52 riveted or otherwise suitably secured to the ruling blade 50 and having a pin 54 adapted to project through an aperture formed in the holder 34. A guide member 56 attached to the blade 50 by suitable studs 58 may be slidably received in the holder 34 and cooperate with the pin 54 as illustrated in Figs. 5 and 6 to maintain the blade 50 in alignment with the holder 34.

To remove the blade 50 from the holder 34 the pin 54 may be depressed by the point of a pencil or any other suitable instrument and the blade 50 withdrawn from the holder by pulling it longitudinally. A plurality of ruling blades 50 of varying length may be selectively inserted into the holder 34 to permit the draftsman to draw parallel or crosshatching lines of any desired length. The blade 50 may be formed of any suitable material and if desired may be transparent.

Means may be provided to move the ruling blade carrier 10 longitudinally of the bar 12 by step-by-step movements of uniformly spaced predetermined distances or by alternately disposed uniformly spaced predetermined distances whereby parallel or crosshatching lines can be drawn along the edge of the ruling blade 50.

One desirable form of such carrier moving means comprises a flexible member 60 extending longitudinally in the bar 12 and engaging a driving mechanism associated with the movable carrier 10. Referring more particularly to Figs. 3 and 4, it will be observed that the flexible member 60 encircles a pulley or sheave drum 62 mounted in the carrier 10 in such a manner that as the pulley is rotated in one direction the ruling blade carrier 10 is advanced along the flexible member 60 extending from one end of the bar 12 to the other.

As illustrated in Fig. 8 each end of the flexible member 60 may be clamped in a threaded sleeve 64 longitudinally movable in a sleeve 66 fixed in each end of the bar 12. A screw 68 received in an aperture 70 engages the sleeve 66 and is threaded into the sleeve 64 to move the sleeve 64 longitudinally in the sleeve 66 to vary the tension of the flexible member 60 engaging the pulley 62. The flexible member 60 should be adjusted to engage the pulley 62 with a sufficient degree of tension that there will be no slippage between the pulley and the flexible member.

One-way driving means may be provided to successively rotate the pulley 62 to intermittently move the carrier 10 longitudinally of the flexible member 60. A one-way clutch member 72 having a plurality of spaced camming surfaces 74 may be rotatably mounted on a screw 76 threaded into the plate 14 of the carrier 10. A plurality of spaced driving rollers 78 may be interposed between the camming surfaces 74 of the clutch member 72 and the inner surface of the pulley 62. The driving rollers 78 may be yieldingly urged towards the converging surfaces of the pulley 62 and the camming surfaces of the member 72 by suitable springs 80 projecting into apertures in the clutch member 72 and extending around a flanged portion 82 of the clutch member 72 to exert a force urging the rollers 78 towards the pulley 62 and the camming surfaces of the member 72. As illustrated in Figs. 3 and 4, the connection between the springs 80 and the driving rollers 78 is a loose fit whereby the rollers are free to move a short distance circumferentially relative to the camming surfaces 74 of the clutch member 72 to exert a driving force on the pulley 62 when the clutch member 72 is rotated in the counterclockwise direction as viewed in Fig. 4.

The clutch member 72 may be centralized in the pulley 62 to maintain the driving rollers 78 in proper operating position by means of a disk 84 projecting into the pulley 62. The disk 84 may be provided with a flange 86 positioned to underlie and support the pulley 62.

An actuating disk 88 is positioned to overlie the clutch member 72 and is provided with a pair of spaced actuating pins 90 and 92 projecting through slots formed in the plate 14 of the carrier 10. The clutch member 72, the centralizing disk 84 and the actuating disk 88 may be fixed together to rotate as a unit on the screw 76 by means of a plurality of spaced rivets 94.

The actuating mechanism may be housed in a suitable cover 96 interposed between the head of the screw 76 and a downwardly extending boss 98 carried by the centralizing disk 84. If desired, the cover 96 may also be attached to the plate 14 by means of spaced screws 100. It will be observed that the screw 76 is provided with a flange 102 to engage a downwardly directed boss 104 formed in the plate 14 to provide suitable clearance between the plate 14 and the cover 96 to permit free rotation of the clutch member 72 and its associated centralizing and actuating disks 84 and 88 respectively.

Manually operable means may be provided to engage the actuating pins 90 and 92 to rotate the actuating disk 88 to rotate the pulley 62 to move the carrier 10 along the flexible member 60.

One suitable form of manually operable means comprises a lever 106 pivotally mounted on the plate 14 at 108 and having a handle 110. The lever 106 is formed with a pair of spaced slots 112 and 114 adapted to receive the actuating pins 90 and 92 respectively.

Means such for example as a coiled spring 116 interposed between the plate 14 and the actuating disk 88 may be provided to yieldingly urge the actuating pins 92 and 94 together with the disk 88 and the clutch member 72 in the clockwise direction towards a centralized position as illustrated in Fig. 2.

It will be noted that as the lever 106 is moved upwardly or in the clockwise direction from the centralized position illustrated in Fig. 2, the pin 90 carried by the disk 88 and projecting through the slot 112 of the lever 106 is actuated to rotate the clutch member 72 in the counterclockwise direction. During this movement the actuating pin 92 carried by the disk 88 moves freely in the slot 114 and does not interfere with the rotation of the actuating disk 88.

A movable stop member 120 carried by a plate 122 may be positioned to engage the lever 106 to limit the actuating movement of the lever. The plate 122 is provided with a slot 124 to receive a thumb screw 126 to lock the plate 122 in any desired adjusted position relative to the plate 14 of the carrier 10. A reference line 128 on the plate 122 cooperates with a scale 130 carried by the plate 14 to indicate the distance the carrier 10 will be moved along the flexible member 60 and bar 10 by predetermined actuation of the lever 106.

As the lever 106 is moved downwardly or in the counterclockwise direction from the centralized position illustrated in Fig. 2 the pin 92 projecting into the slot 114 of the lever 106 is actuated to rotate the disk 88 and clutch member 72 in the counterclockwise direction. The actuating pin 90 moves freely in the slot 112 and therefore does not prevent actuation of the clutch member 72 and pulley 62 by movement of the pin 92.

A movable stop member 132 carried by a plate 134 may be provided to limit movement of the lever 106 when actuating the pin 92. The plate 134 may be suitably guided on the plate 14 and may be adjustably locked thereto by means of a thumb screw 136 projecting through a slot 138 in the plate 134. A reference line 140 carried by the plate 134 cooperates with a scale 142 on the plate 14 to indicate the distance the carrier 10 will be moved along the bar 12 by predetermined movement of the lever 106.

It will be noted that the indications of the scale 130 are smaller than the graduations of the scale 142. The reason for this is the fact that the actuating pin 90 is closer to the pivot point 108 of the lever 106 than is the actuating pin 92, and therefore does not move so far as the pin 92 does by movement of the lever 106. Since the pin 92 is further from the pivot 108 of the lever 106 than the pin 90, the actuating disk 88 will be rotated further to move the carrier 10 a greater distance longitudinally of the bar 12 than a corresponding movement of the lever 106 applied to the actuating pin 90.

The bar 12 may be detachably connected to the drafting board to facilitate operation of the device. Needle points 150 carried by spring clips 152 secured to the bar 12 as by rivets 154 may project through apertures 156 to engage the surface of the drafting board. Extensions 158 of the clips 152 project longitudinally of the bar 12 in such a manner as to be readily engaged to withdraw the points 150 from the board to release the instrument.

The operation of this device to form parallel or crosshatching lines is as follows: The bar 12 is placed on the drafting board or other place where it is desired to draw parallel lines. If desired the bar 10 may be aligned with one edge of a T-square or other drafting instrument having a straight edge.

When the device is being used by a right handed draftsman, the attaching segments 28 of the protractor 24 are attached to the thumb screws 30 of the carrier 10 as illustrated in Figs. 1 and 2. The angularity of the ruling blade 50 relative to the bar 12 may be adjusted by manipulation of the thumb screw 42 to lock the blade 50 in any desired angular position on the protractor 24. When the desired angularity of the ruling blade has been established the needle points 150 at the ends of the bar 12 may be depressed to detachably lock the bar 12 on the drafting board.

If it is desired to draw uniformly spaced parallel lines such as are employed to indicate iron, one or both of the adjustable stops 120 and 132 may be moved to align the reference lines 128 and 140 of the plates 122 and 134 respectively with the figure of the scales 130 and 142 indicating the desired distance between the parallel lines to be drawn. For example, if it is desired that the parallel lines be spaced one-eighth of an inch apart, one or both of the adjustable plates 122 and 134 should be adjusted to align its associated reference line with the one-eighth inch indication on the associated scale 130 or 142 respectively. The thumb screws 126 and 136 should then be tightened to lock the plates in the desired position.

The carrier 10 should then be moved towards the left hand end of the bar 12. This movement of the carrier is possible because the drum or pulley 62 is free to rotate in the clockwise direction, as viewed in Fig. 4, on the clutch member 72 to move the carrier 10 longitudinally on the flexible member 60.

When the ruling blade 50 is in the desired starting position relative to the drawing, a line is drawn along the edge of the blade 50. The lever 106 is then actuated by a force exerted on the handle 110. If both of the adjustable stops 120 and 132 have been set to permit the desired movement of the carrier 10, the lever 106 may be moved in either direction. Upward movement of the lever 106 as viewed in Fig. 2 transmits a force through the pin 90 to rotate the actuating disk 88 in the counterclockwise direction, the actuating pin 92 moving freely in the slot 114. If the lever 106 is moved downwardly as viewed in Fig. 2, a force is exerted through the pin 92 to rotate the actuating disk 88 in the counterclockwise direction also, and the pin 90 moves freely in the slot 112.

Counterclockwise movement of the actuating disk 88 is transmitted through the rivets 94, clutch member 72 and driving rollers 78 to rotate the drum or pulley 62. Rotation of the pulley 62 causes the carrier 10 to move along the flexible member 60 a distance corresponding to the extent of movement of the lever 106 permitted by the adjustable stops 120 and 132.

When the actuating lever is released the force exerted on the actuating disk 88 by the spring 116 returns the lever to the neutral position shown in Fig. 2 wherein both of the pins 90 and 92 are in engagement with their actuating portions of the lever 106. The one-way driving means formed by the rollers 78 interposed between the clutch member 72 and the pulley 62 permits clockwise rotation of the pins 90 and 92 and the actuating disk 88 without rotating the pulley 62 relative to the flexible member 60.

When the adjustable stops 120 and 132 are set to permit equal movement of the carrier 10 by movement of the lever 106 in opposite directions, the lever 106 can be successively actuated in either direction or may be alternately actuated in opposite directions.

The springs 20 engaging the guide tracks 18 of the bar 12 hold the carrier 10 against unintentional movement in either direction. When the ruling blade 50 has thus been moved by actuation of the lever 106, the next parallel line can be drawn. This operation is continued until the carrier 10 reaches the right hand end of the bar 12. The extensions 158 of the clips 152 may then be lifted to withdraw the needle points 150 from the drafting board. The bar 10 may then be moved longitudinally relative to the drawing to a new position and the operation repeated. The ruling edge after being moved may be quickly aligned with the last drawn line to continue equal spacing by returning the carriage beyond the last drawn line and actuating the lever with partial strokes until the ruling blade is aligned with the line. Then a full stroke may be taken and the drawing continued.

If it is desired that unequally spaced parallel lines be drawn as for example to indicate steel or aluminum, one of the adjustable stops 120 or 132 can be positioned to permit movement of the lever 106 to move the carrier 10 the distance between one set of lines, and the other of the adjustable stops can be positioned to permit movement of the carrier 10 corresponding to the distance between the other set of lines. For example, assume that it is desired that alternately spaced parallel lines of one-eighth inch and one-quarter inch be drawn. The plate 122 carrying the stop 120 should be positioned so that its reference line 128 corresponds with the one-eighth inch indication of the scale 130 as illustrated in Fig. 2. The plate 134 carrying the stop 132 should be positioned so that its reference line 140 is aligned with the one-quarter inch indication of the scale 142 as illustrated in Fig. 2. If the lever 106 is now actuated alternately upwardly and downwardly, alternately spaced parallel lines of one-eighth inch and one-quarter inch can be drawn.

It is also possible to draw a plurality of parallel lines of one spacing alternating with any desired number of lines of another spacing. To do so it is only necessary to successively actuate the lever 106 in the appropriate direction a number of times corresponding to the number of parallel lines of a given spacing desired, and to then actuate the lever 106 in the opposite direction a number of times corresponding to the number of parallel lines of the other spacing desired.

The instrument can readily be used by left handed draftsmen. The protractor 24 should be disconnected from the thumb screws 30 of the carrier 10 and the bifurcated attaching segments 28 of the protractor applied to the thumb screws 32 on the opposite side of the carrier 10. The carrier 10 will then move in the opposite direction on the bar 12 when the lever 106 is actuated, and the left handed draftsman will use the opposite edge of the ruling blade 50.

It will be understood of course that this instrument is not limited to use as a crosahatching instrument but may be used wherever parallel lines of uniform or non-uniform spacing are desired, such for example as by bookkeepers, accountants, etc.

I claim:

1. In a crosshatching device, a bar having a flexible member extending longitudinally relative thereto, a ruling blade carrier having a rotatable member engaged by the flexible member, one-way driving means associated with the carrier for controlling the rotatable member, manually operable means to actuate the one-way driving means, and adjustable stop means to limit movement of the one-way driving means.

2. In a crosshatching device, a longitudinally extending bar, a carrier movable on the bar, a protractor, manually operable means whereby the protractor may be detachably connected to opposite sides of the carrier, a ruling blade, connecting means between the ruling blade and protractor whereby the angular position of the ruling blade relative to the carrier may be varied, and manually operable means for moving the carrier longitudinally on the bar by step-by-step movements of adjustable predetermined amounts.

3. In a crosshatching device, a longitudinally extending bar, a ruling blade carrier movably mounted on the bar, adjustable yielding means resisting movement of the carrier relative to the bar, motion transmitting means comprising flexible and rotatable members between the bar and carrier controlling movement of the carrier on the bar, one-way driving means to actuate the rotatable member, a pair of spaced actuating pins operably connected to the one-way driving means, manually operable means movable in opposite directions to actuate said pins, yielding means urging the actuating pins towards a predetermined position, and spaced adjustable stop means to limit movement of the manually operable means in opposite directions to independently control the movement of the carrier along the bar as the manually operable means is actuated in opposite directions.

4. In a crosshatching device, a longitudinally extending bar, a carrier, motion transmitting means between the bar and carrier, manually operable means controlling the motion transmitting means whereby the carrier may be progressively advanced longitudinally of the bar in one direction, a ruling blade, and detachable connecting means between the ruling blade and the carrier whereby the blade may be attached to opposite sides of the carrier to adapt the device for right or left handed operation.

5. A crosshatching device comprising a bar having a flexible member extending longitudinally relative thereto, a ruling blade carrier having a rotatable member engaged by the flexible member, one-way driving means associated with the carrier for controlling the rotatable member, a plurality of spaced means to actuate the one-way driving means, manually operable means movable in opposite directions to engage and operate said spaced actuating means, and spaced adjustable stop means to limit movement of the manually operable means in opposite directions.

6. A crosshatching device comprising a longitudinally extending bar, a carrier movable in the bar, a protractor, manually operable means whereby the protractor may be detachably connected to the carrier, a ruling blade, connecting means between the ruling blade and protractor whereby the angular position of the ruling blade relative to the carrier may be varied, motion transmitting means between the carrier and bar whereby the carrier may be moved longitudinally of the bar, spaced actuating means controlling the motion transmitting means, manually operable means movable in opposite directions controlling the actuating means, and adjustable stop means to limit movement of the manually operable means in opposite directions.

7. A crosshatching device comprising a longitudinally extending bar, a ruling blade carrier movably mounted on the bar, motion transmitting means between the bar and carrier controlling movement of the carrier on the bar, one-way driving means to actuate the motion transmitting means, a pair of spaced actuating pins operably connected to the one-way driving means, a pivoted lever movable angularly in opposite directions to actuate said pins, yielding means urging the lever towards a predetermined position, and spaced adjustable stop means to limit angular movement of the lever in opposite directions to independently control the movement of the carrier along the bar as the lever is actuated in opposite directions.

8. A crosshatching device comprising a bar, a ruling blade carrier movable longitudinally on the bar, connecting means between the bar and carrier including a flexible member extending longitudinally of the bar and a rotatable member mounted in the carrier and engaged by the flexible member, one-way driving means controlling the rotatable member comprising a clutch disk having angularly inclined working surfaces and driving members between the working surfaces of the clutch disk and said rotatable member, an actuating disk controlling the clutch disk, yielding means urging the actuating disk to rotate in one direction, a pair of spaced actuating pins carried by the actuating disk, a manually operable lever pivotally mounted on the carrier and having a pair of spaced working surfaces to engage the actuating pins whereby one of said pins may be actuated to rotate the clutch disk when the lever is selectively operated in opposite directions, and manually adjustable stop members to limit movement of the actuating lever in opposite directions to selectively control the extent of movement of the carrier along the bar as the lever is actuated in opposite directions.

9. A crosshatching device comprising a bar, a carrier, motion transmitting means between the bar and carrier, one-way driving means controlling the motion transmitting means, manually operable means to actuate the one-way driving means whereby the carrier may be progressively advanced longitudinally of the bar in one direction, a protractor, a ruling blade, connecting means between the protractor and the ruling blade whereby the angular relation of the ruling blade may be varied, and detachable connecting means between the protractor and the carrier whereby the ruling blade may be attached to opposite sides of the carrier to adapt the device for right or left handed operation.

10. In a crosshatching device, a bar, a ruling blade carrier movable longitudinally on the bar, a protractor, connecting means between the carrier and the protractor, a ruling blade, connecting means between the ruling blade and the protractor whereby the angular relation of the ruling blade relative to the bar can be adjusted, connecting means between the bar and carrier including a flexible member extending longitudinally of the bar and a rotatable member mounted in the carrier and engaged by the flexible member, one-way driving means controlling the rotatable member, an actuating disk controlling the one-way driving means, yielding means urging the actuating disk to rotate in one direction, a pair of spaced actuating pins carried by the actuating disk, a manually operable lever pivotally mounted on the carrier and having a pair of spaced working surfaces to engage the actuating pins whereby one of said pins may be actuated to rotate the actuating disk when the lever is selectively operated in opposite directions, and manually adjustable stop members to limit movement of the actuating lever in opposite directions to selectively control the extent of movement of the carrier along the bar as the lever is actuated in opposite directions.

11. In a crosshatching device, a bar, a ruling blade carrier slidably mounted on the bar, one-way driving means between the bar and carrier, spaced actuating means for the one-way driving means, a lever pivoted on the carrier and movable in opposite directions from a neutral position, spaced connecting means between the actuating means and lever, and spaced stop means for limiting movement of the lever in opposite directions.

12. A crosshatching device comprising a ruling blade carrier having a rotatable drum, a longitudinally-extending bar having a flexible member encircling the rotatable drum, and manually operable means movable in opposite directions from a neutral position controlling the rotatable drum to move the carrier varying predetermined integrals in the same direction longitudinally relative to the bar when the manually-operable means is moved in opposite directions from the neutral position.

13. In a crosshatching device, a longitudinally-extending bar, a ruling blade carrier, and connecting means between the carrier and bar comprising a lever movable in opposite directions from a neutral position whereby the carrier may be moved longitudinally of the bar by step-by-step movements of different predetermined lengths as the lever is moved in opposite directions from the neutral position.

14. A device for forming parallel lines comprising a pair of members, manually operable motion-transmitting means between said members whereby one of said members may be moved longitudinally relative to the other in a single direction as the manually-operable means is moved in opposite directions from a neutral position, and spaced adjustable means for varying the movement of the movable member as the manually-operable means is moved in opposite directions from the neutral position.

15. In a crosshatching device, a bar, a carrier, motion-transmitting means comprising a lever movable in opposite directions from a neutral position between the bar and carrier whereby the carrier may be progressively moved in a single direction relative to the bar, and spaced adjustable means for controlling the movement of the motion-transmitting means in opposite directions to vary the movement of the carrier along the bar as the lever is moved in opposite directions from the neutral position.

16. A device for forming a plurality of uniformly-spaced parallel lines of predetermined spacings comprising a longitudinally-extending member, a ruling blade carrier, motion transmitting means between the longitudinally-extending member and the ruling blade carrier whereby the carrier may be progressively moved along the longitudinally-extending member by step-by-step movements of adjustable predetermined length, a ruling blade, connecting means between the blade and carrier whereby the blade may be selectively attached to opposite sides of the carrier to move in opposite directions in the formation of parallel lines to adapt the device for use by right- or left-handed operators.

17. In a device for drawing parallel lines, a bar having a flexible member extending longitudinally thereof, a ruling blade carrier having a rotatable member engaged by the flexible member, one-way driving motion-transmitting means controlling the rotatable member, a lever for actuating the motion-transmitting means to move the carrier along the bar, a ruling blade, and selectively-operable attaching means between the ruling blade and the carrier whereby the blade may be detachably connected to opposite sides of the carrier and the position of the bar reversed to selectively reverse the direction of movement of the ruling blade to accommodate right- or left-handed operation.

18. A device for forming parallel lines of different predetermined spacings comprising a longitudinally-extending member, a ruling blade carrier, motion-transmitting means between the longitudinally-extending member and the ruling blade carrier comprising a lever movable in opposite directions from a neutral position whereby the carrier may be moved different distances longitudinally of the member as the lever is moved in opposite directions from the neutral position, and separate manually-operable adjusting means to change the extent of movement of the carrier along the member when the lever is moved in opposite directions from the neutral position.

RAYMOND J. MILLER.